United States Patent
Oto (10) Patent No.: US 8,398,241 B2
(45) Date of Patent: Mar. 19, 2013

(54) HALF-WAVE PLATE, OPTICAL PICKUP DEVICE, POLARIZATION CONVERSION ELEMENT, AND PROJECTION DISPLAY DEVICE

(75) Inventor: Masayuki Oto, Okaya (JP)

(73) Assignee: Seiko Epson Corporation (JP)

( * ) Notice: Subject to any disclaimer, the term of this patent is extended or adjusted under 35 U.S.C. 154(b) by 323 days.

(21) Appl. No.: 12/916,683

(22) Filed: Nov. 1, 2010

(65) Prior Publication Data

US 2011/0102746 A1   May 5, 2011

(30) Foreign Application Priority Data

Nov. 2, 2009   (JP) .................................. 2009-252228

(51) Int. Cl.
G03B 21/14   (2006.01)
G02B 5/30    (2006.01)
G01B 7/00    (2006.01)

(52) U.S. Cl. ............... 353/20; 359/489.07; 369/112.19
(58) Field of Classification Search .................... 353/20; 359/489.01, 489.07; 369/112.16–112.19
See application file for complete search history.

(56) References Cited

U.S. PATENT DOCUMENTS

| | | | |
|---|---|---|---|
| 7,618,715 B2 | 11/2009 | Ushino et al. | |
| 7,855,834 B2* | 12/2010 | Kobayashi et al. | 359/489.01 |
| 7,894,321 B2* | 2/2011 | Oto | 369/112.22 |
| 7,936,508 B2* | 5/2011 | Oto | 359/489.07 |
| 7,986,608 B2* | 7/2011 | Oto | 369/112.17 |
| 7,995,276 B2* | 8/2011 | Oto | 359/489.07 |
| 8,000,208 B2* | 8/2011 | Oto | 369/112.22 |
| 8,031,401 B2* | 10/2011 | Oto | 359/489.07 |
| 8,107,351 B2* | 1/2012 | Oto | 369/112.27 |
| 8,233,101 B2* | 7/2012 | Oto | 349/9 |
| 2007/0291357 A1* | 12/2007 | Oto | 359/485 |
| 2008/0180799 A1* | 7/2008 | Ooto | 359/483 |
| 2008/0239487 A1 | 10/2008 | Kobayashi et al. | |
| 2010/0103084 A1* | 4/2010 | Oto | 345/88 |
| 2010/0110543 A1* | 5/2010 | Kaizawa et al. | 359/499 |
| 2010/0182691 A1* | 7/2010 | Oto | 359/485 |
| 2011/0102746 A1* | 5/2011 | Oto | 353/20 |
| 2011/0170400 A1* | 7/2011 | Oto | 369/112.23 |

FOREIGN PATENT DOCUMENTS

| | | |
|---|---|---|
| JP | 52-4948 | 2/1977 |
| JP | 63-43721 | 9/1988 |
| JP | 3-58081 | 9/1991 |
| JP | 2005-158121 | 6/2005 |
| JP | 2005-208588 | 8/2005 |
| JP | 2006-040343 | 2/2006 |
| JP | 2007-304572 | 11/2007 |
| JP | 2008-268901 | 11/2008 |
| JP | 2009-103863 | 5/2009 |
| JP | 2009-122689 | 6/2009 |

* cited by examiner

Primary Examiner — William C Dowling
(74) Attorney, Agent, or Firm — Harness, Dickey & Pierce, P.L.C.

(57) ABSTRACT

A half-wave plate includes a single crystal plate made of an inorganic material having a birefringent property and rotatory power, wherein a polarization plane of linearly polarized light entering from an entrance surface of the crystal plate is rotated and then output from an exit surface of the crystal plate.

32 Claims, 9 Drawing Sheets

HALF-WAVE PLATE, OPTICAL PICKUP DEVICE, POLARIZATION CONVERSION ELEMENT, AND PROJECTION DISPLAY DEVICE

BACKGROUND

1. Technical Field

The present invention relates to a half-wave plate made in particular of an inorganic crystalline material having a birefringent property and rotatory power such as quartz crystal. Further, the invention relates to an optical pickup device, a polarization conversion element, and a projection display device using the half-wave plate.

2. Related Art

In the past, half-wave plates for outputting outgoing light, which is linearly polarized light having a polarization plane obtained by rotating the polarization plane of linearly polarized light as the incident light by predetermined angle, for example, 90°, have been used in optical devices such as optical pickup devices used for recording/reproduction in optical disk drives, polarization conversion elements, or projection display devices such as liquid crystal projectors. In general, as a material of the wave plate, there are used a resin film made of an organic material such as polycarbonate provided with a birefringent property by a stretching process, a retardation plate obtained by sandwiching a polymer liquid crystal layer with transparent substrates, and a crystal plate made of an inorganic material having a birefringent property such as quartz crystal (see, e.g., JP-A-2005-208588, JP-A-2006-40343, JP-B-52-4948, and JP-B-3-58081).

In particular, optical pickup devices used for recording/reproduction in optical disk drives each adopt a blue-violet laser with an extremely short wavelength and high power in order for achieving high density and high capacity recording. However, the resin films and the liquid crystal materials made of the organic materials described above have properties of being apt to absorb light in a range of blue through ultraviolet. Therefore, the materials absorb the blue-violet laser to generate heat, and might cause deterioration of the materials themselves to hinder the function of the wave plate.

Further, in optical disc recording/reproduction devices compliant with the Blu-ray standard, the half-wave plate is disposed adjacent to the laser source of each of the optical pickup devices, and is exposed in an extremely high temperature environment for a long period of time. Similarly, in liquid crystal projectors, the half-wave plate is disposed the closest to the white light source, and is exposed in an extremely high temperature environment for a long period of time. Therefore, in either case, the half-wave plate is required to have high light resistance and long-term reliability. In this viewpoint, the inorganic crystal materials such as quartz crystal have extremely high light resistance, and in particular, quartz crystal wave plates are advantageously used in the optical systems using the blue-violet lasers.

Further, the quartz crystal has not only the birefringent property but also the rotatory power with respect to the direction of a crystal optical axis. It is well known that the rotatory power can have an influence on the performance of the wave plate depending on the cutting angle of the quartz crystal plate. In order for eliminating the influence of the rotatory power, there is proposed a wave plate having two wave plates made of an optical material stacked so as to overlap with each other with the respective optical axes intersect with each other, and arranged so that the phase difference between the both wave plates, optical axis azimuth angle, rotatory power, and the angle formed between the rotation axis and the neutral axis satisfy a predetermined relational expression, thereby improving characteristics in a broad spectrum (see, e.g., JP-A-2005-158121).

However, in the half-wave plate formed of a quartz crystal single plate, the design method considering the variation in the polarization state due to the rotation of the polarization plane caused by the rotatory power in addition to the variation in the polarization state due to the phase difference caused by the birefringent property has not ever been reported as far as at least the inventors know. Therefore, there arises a problem that if the design phase difference of the quartz crystal half-wave plate is set to 180°, the conversion efficiency does not necessarily become 100% depending on the cutting angle of the quartz crystal plate.

The polarization state of the quartz crystal half-wave plate will be explained using the Poincare sphere shown in FIG. 11. Assuming the reference point of the incident light of the linear polarized light as the point $P_0=(1, 0, 0)$ on the S1 axis, the rotational axis $R_1$ is set in a position specified by rotating the S1 axis as much as the angle $2\theta 1$ ($\theta$ denotes the optical axis azimuth angle of the quartz crystal plate), and further tilting it toward the north pole (S3) as much as the angle $2\rho$ ($\rho$ denotes the rotatory angle of the quartz crystal plate) with respect to the S1-S2 plane. When rotating the point $P_0$ rightward as much as the phase difference $\Gamma=180°$ around the rotational axis $R_1$, the resulting point $P_1$ corresponds to the position of the outgoing light.

Figure 11:
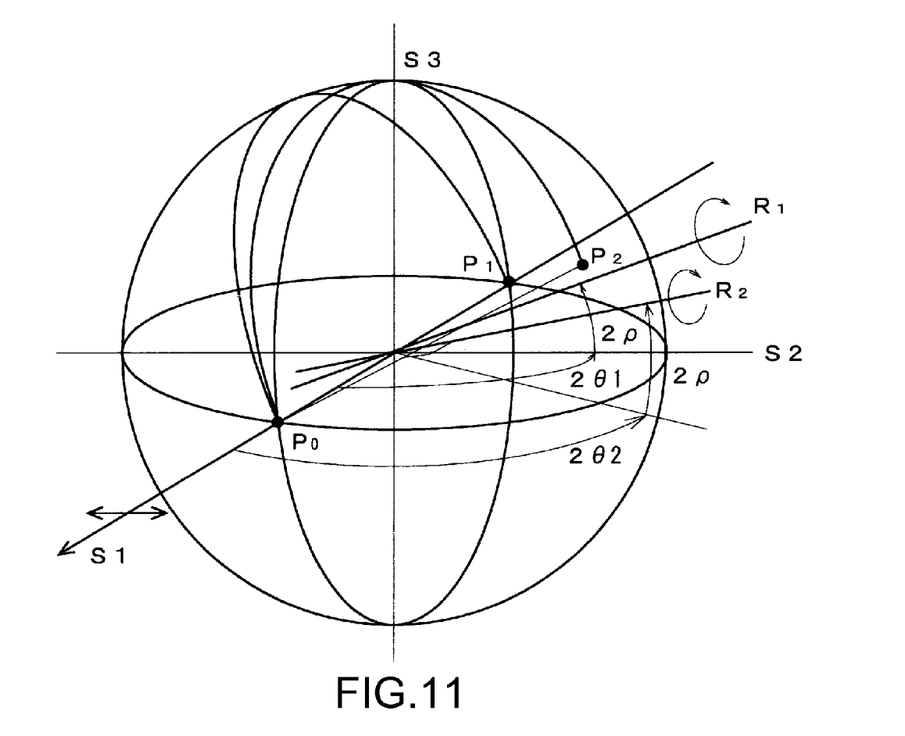
FIG. 11 is a diagram showing a Poincare sphere representing a polarization state of a quartz crystal half-wave plate of the related art.

In FIG. 11, in the case of the optical axis azimuth angle $\theta 1=45°$, since the rotational axis $R_1$ exists on the S2-S3 plane, when rotating the point $P_0$ rightward around the rotational axis $R_1$ as much as 180°, the position of the outgoing light always comes to the point $P_1=(-1, 0, 0)$ on the equator of the Poincare sphere. On this occasion, the conversion efficiency of the quartz crystal wave plate is 1. However, in the case of the optical axis azimuth angle $\theta 2 \neq 45°$, since the rotational axis $R_2$ fails to come on the S2-S3 plane, a point $P_2$ shifted from the equator of the Poincare sphere becomes the position of the outgoing light. Therefore, the conversion efficiency of the quartz crystal wave plate is degraded.

Figure 12:
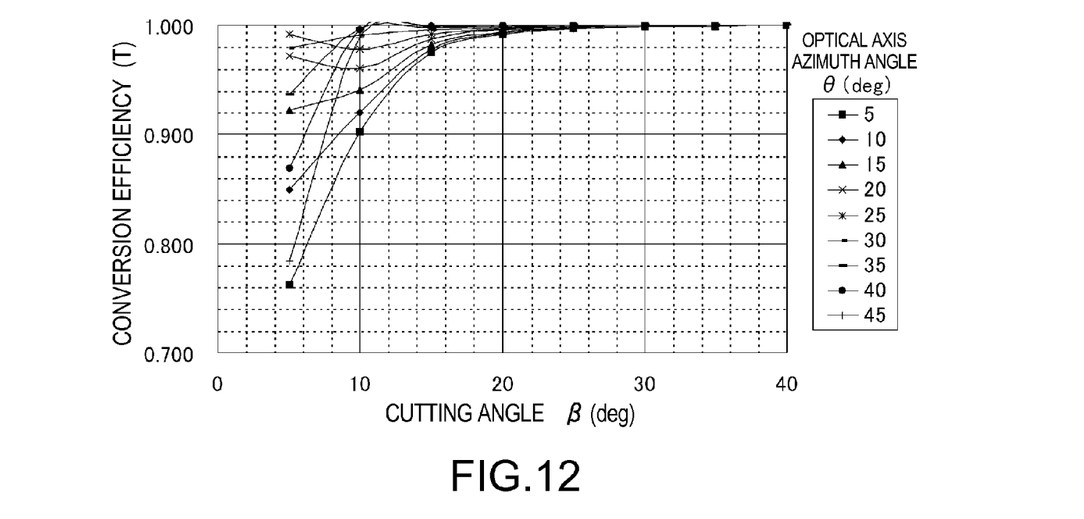
FIG. 12 is a diagram representing a conversion efficiency T with respect to the cutting angle of the quartz crystal half-wave plate of the related art.

The rotatory power of the quartz crystal plate becomes the strongest in the optical axis direction of the quartz crystal. Therefore, the larger the cutting angle of the quartz crystal plate, namely the angle formed between the optical axis thereof and the normal line with respect to the principal surface thereof, is set, the smaller the influence of the rotatory power becomes. FIG. 12 shows the result of the simulation of the variation in the conversion efficiency T with respect to the cutting angle for respective values of the optical axis azimuth angle $\theta$ ($\theta=5°, 10°, 15°, 20°, 25°, 30°, 35°, 40°,$ and $45°$) in the quartz crystal half-wave plate with the design phase difference of 180°. According to the drawing, it is understood that the conversion efficiency is remarkably degraded with the cutting angle equal to or smaller than 30°.

Therefore, by setting the cutting angle to be larger than 30°, the high conversion efficiency approximating 1 can be obtained. However, in the range of 30 through 90°, the thickness of the quartz crystal plate becomes as thin as about 10 through 26 μm. Therefore, since the strength of the quartz crystal plate is remarkably degraded to make the quartz crystal plate easy to be broken, handling in manufacturing processes and in use is extremely difficult.

Further, the blue-violet lasers cause a problem that wavelength of the oscillated laser drifts (varies) when generating high heat and expanding in use. Therefore, in the case of using the blue-violet lasers in the light sources of the optical pickup devices, there arises in the half-wave plate a problem that the conversion efficiency of the linearly polarized light is deteriorated due to the wavelength drift of the incident laser beam. In particular, since the half-wave plate in a higher-order mode has a large thickness, an amount of the variation thereof increases as the phase difference increases, and the conversion efficiency is more significantly deteriorated.

SUMMARY

Therefore, in view of the problems described above, the invention has an advantage of improving the conversion efficiency and the light efficiency of the half-wave plate formed of a single crystal plate having a thickness, with which the plate is workable in manufacturing and relatively easy to handle, and made of an inorganic material having a birefringent property and rotatory power.

Another advantage of some aspects of the invention is to realize an optical pickup device, which is hard to be affected by the wavelength fluctuation due to, for example, wavelength drift, and can exert preferable performance stably in a broader wavelength band compared to the related art, and is suitable for a higher recording density optical disc drive, a polarization conversion element capable of using the optical energy with higher efficiency, and a reflective liquid crystal display device with higher light efficiency compared to the related art by using such a half-wave plate with high conversion efficiency.

Figure 1:
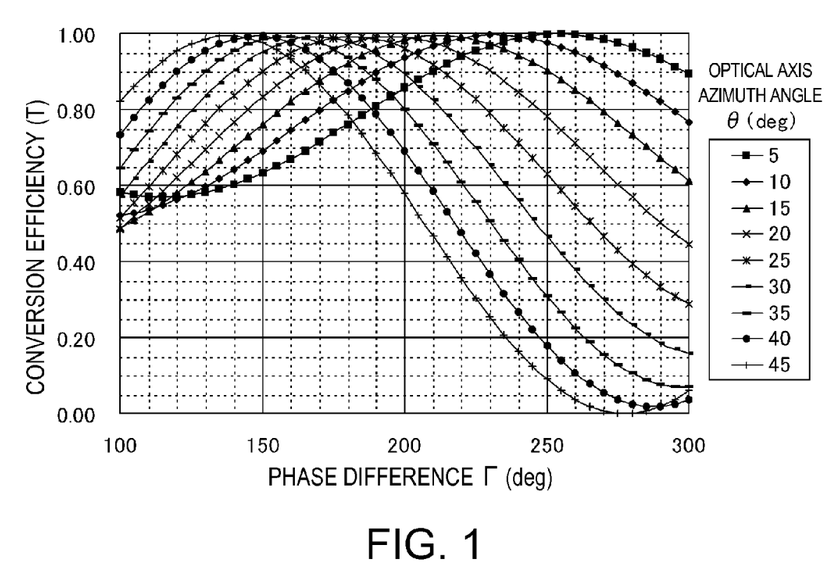
FIG. 1 is a diagram showing a variation in conversion efficiency T with respect to the phase difference for each of the values of the optical axis azimuth angle θ different from each other in a quartz crystal half-wave plate with a cutting angle of 5°.

The inventors have conducted verification of the relationship between the phase difference and the conversion efficiency with respect to the quartz crystal half-wave plate. FIG. 1 shows the result of the simulation of the variation in the conversion efficiency T with respect to the phase difference for respective values of the optical axis azimuth angle $\theta$ ($\theta$=5°, 10°, 15°, 20°, 25°, 30°, 35°, 40°, and 45°) in the half-wave plate formed of the single quartz crystal plate carved out with the cutting angle of 5°. According to the drawing, it is understood that the conversion efficiency varies depending on the optical axis azimuth angle $\theta$, and that there exists a range of the phase difference in which the high conversion efficiency of 1 or approximating 1 can be obtained in either of the cases in which the angle $\theta$ takes respective values. Therefore, even if the conversion efficiency is degraded at the design phase difference of $\Gamma$=180°, the conversion efficiency can be improved by adjusting the phase difference adding an appropriate correction amount.

Figure 2:
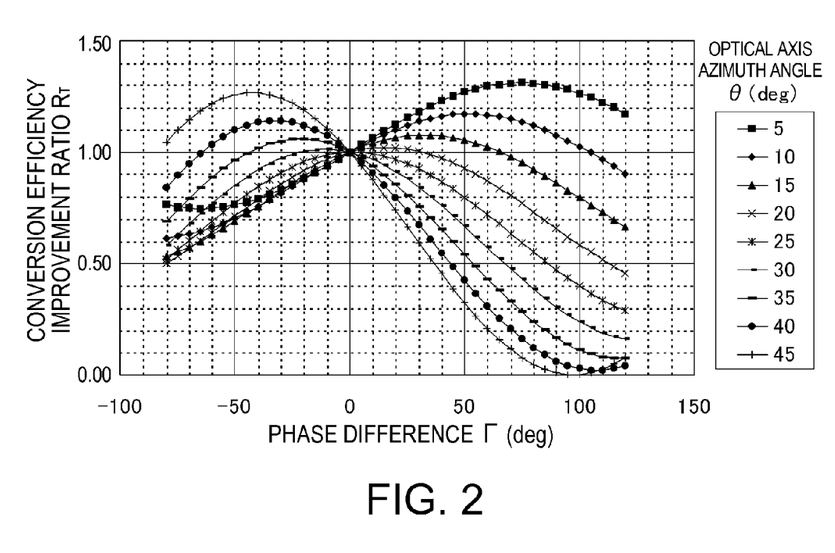
FIG. 2 is a diagram showing a variation in conversion efficiency improvement ratio $R_T$ with respect to the phase difference correction amount for each of the values of the optical axis azimuth angle θ different from each other in a quartz crystal half-wave plate with the cutting angle of 5°.

Then, the inventors have conducted verification of the relationship between the phase difference and the conversion efficiency with respect to the quartz crystal half-wave plate. FIG. 2 shows the result of the simulation of the variation in the conversion efficiency improvement ratio $R_T$ with respect to the correction amount of the phase difference for respective values of the optical axis azimuth angle $\theta$ ($\theta$=5°, 10°, 15°, 20°, 25°, 30°, 35°, 40°, and 45°) in the half-wave plate formed of the single quartz crystal plate carved out with the same cutting angle of 5°. Here, the conversion efficiency improvement ratio $R_T$ denotes a ratio between the conversion efficiency $T_0$ at the design phase difference of $\Gamma$=180° and the conversion efficiency $T_1$ after the correction, namely $T_1/T_0$.

The drawing shows that the conversion efficiency is improved in the range of $R_T$>1, compared to the case of the design phase difference of $\Gamma$=180°, and that the phase difference correction amount necessary for improving the conversion efficiency varies depending on the optical axis azimuth angle $\theta$. Further, according to the drawing, it is understood that there exist the maximum value and the minimum value in the phase difference correction amount satisfying $R_T$>1, and the conversion efficiency can be improved in a range defined by the maximum value and the minimum value. On the other hand, there is no range at the angle $\theta$=25° for satisfying $R_T$>1, and there is no need to adjust the design phase difference of $\Gamma$=180°.

From these simulation results, the inventors have found out the fact that it is possible to correct the variation in the polarization state due to the rotatory power to thereby improve the conversion efficiency of the half-wave plate to 1 or a value extremely close to 1 by setting the design phase difference to a value obtained by adding the phase difference correction amount, which has the cutting angle $\beta$ of the quartz crystal plate and the optical axis azimuth angle $\theta$ as the parameters, to 180° as the variation amount of the phase due to the birefringent property in the related art. Therefore, the inventors have further conducted various simulations and experiments using the cutting angle $\beta$ of the quartz crystal plate as a parameter to verify the relationship between the optimum design phase difference and the optical axis azimuth angle corresponding to the cutting angle $\beta$.

Figure 3:
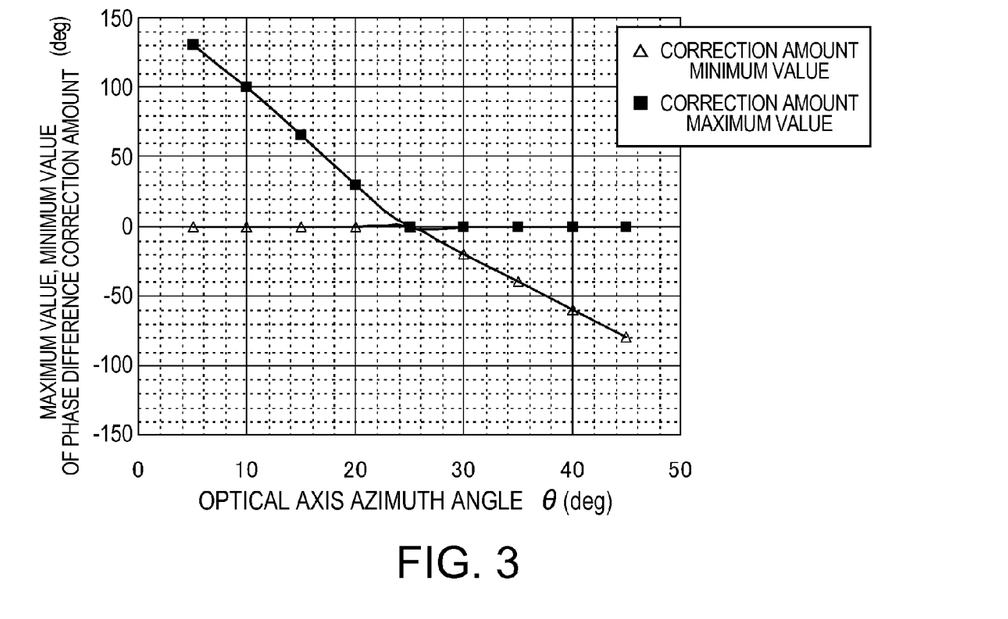
FIG. 3 is a diagram showing relationships between the minimum value $\Gamma a_{min}$, the maximum value $\Gamma a_{max}$ of the phase difference correction amount satisfying $R_T>1$ and the optical axis azimuth angle θ.

FIG. 3 shows the relationships between the minimum value $\Gamma a_{min}$, the maximum value $\Gamma a_{max}$ of the phase difference correction amount $\Gamma a$ with which the conversion efficiency improvement ratio $R_T$ becomes higher than 1 with respect to the phase difference of $\Gamma$=180° and the optical axis azimuth angle $\theta$. In the drawing, the conversion efficiency is improved when the phase difference correction amount $\Gamma a$ exists between the curve representing $\Gamma a_{min}$ and the curve representing $\Gamma a_{max}$ namely in the range of $\Gamma a_{min}<\Gamma a<\Gamma a_{max}$.

Figure 4:
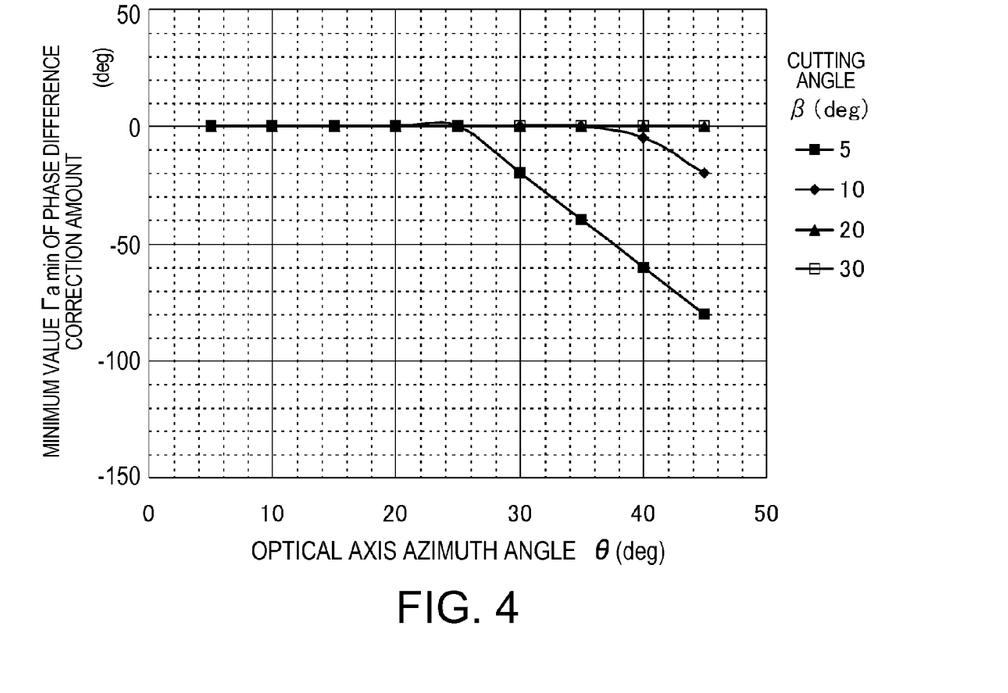
FIG. 4 is a diagram showing a relationship between the optical axis azimuth angle θ and the minimum value $\Gamma a_{min}$ of the phase difference correction amount.

FIG. 4 shows the relationship between the optical axis azimuth angle $\theta$ and the phase difference correction amount minimum value $\Gamma a_{min}$, in the cases in which the cutting angle $\beta$ takes the respective values ($\beta$=5°, 10°, 20°, and 30°). According to the drawing, it is understood that the correction amount minimum value $\Gamma a_{min}$ depends on the cutting angle $\beta$ and the optical axis azimuth angle $\theta$, and is determined by these values.

Figure 5:
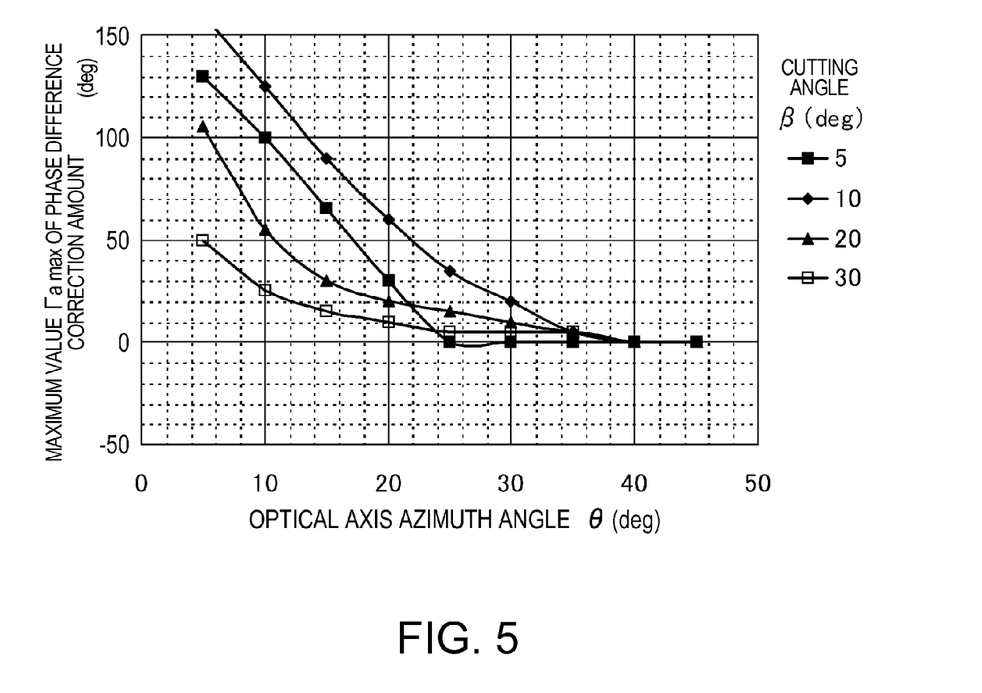
FIG. 5 is a diagram showing a relationship between the optical axis azimuth angle θ and the maximum value $\Gamma a_{max}$ of the phase difference correction amount.

FIG. 5 shows the relationship between the optical axis azimuth angle $\theta$ and the phase difference correction amount maximum value $\Gamma a_{max}$ in the cases in which the cutting angle $\beta$ takes the respective values ($\beta$=5°, 10°, 20°, and 30°). According to the drawing, it is similarly understood that the correction amount maximum value $\Gamma a_{max}$ depends on the cutting angle $\beta$ and the optical axis azimuth angle $\theta$, and is determined by these values.

Therefore, it is assumed that the relationship between the phase difference correction amount $\Gamma a$ with which the conversion efficiency improvement ratio $R_T$ becomes higher than 1 with respect to the phase difference of $\Gamma$=180°, cutting angle $\beta$, and the optical axis azimuth angle $\theta$ can be represented by the following relational expression, and the coefficients $A_0$ through $A_{15}$ of the respective terms are obtained by a regression calculation.

$$\Gamma a = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

As a result, the correlation factor is equal to or higher than 0.99, and the preferable correlation with the measured values is obtained. The invention is made based on such a finding.

According to an aspect of the invention, there is provided a half-wave plate including a single crystal plate made of an inorganic material having a birefringent property and rotatory power, wherein a polarization plane of linearly polarized light entering from an entrance surface of the crystal plate is rotated and then output from an exit surface of the crystal plate, and assuming that a phase difference of the half-wave plate is $\Gamma$, a correction amount of the phase difference is $\Gamma a$, an optical axis azimuth angle formed between an optical axis projection line obtained by projecting the optical axis of the crystal plate on the entrance surface and a polarization plane of the linearly polarized light entering the entrance surface is θ, and an angle β formed between a normal line with respect to the entrance surface of the crystal plate and an optical axis of the crystal plate is set in a range of $5°≦β≦30°$, the following expressions are satisfied.

$$\Gamma = 180° + \Gamma a$$

$$\Gamma a_{min} < \Gamma a < \Gamma a_{max}$$

$$\Gamma a_{min} = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

where:
$A_0 = -58.9286$;
$A_1 = 12.35938$;
$A_2 = 12.8869$;
$A_3 = -2.75654$;
$A_4 = -0.571$;
$A_5 = -0.7629$;
$A_6 = 0.134076$;
$A_7 = 0.164482$;
$A_8 = -0.00816$;
$A_9 = 0.004949$;
$A_{10} = 0.013294$;
$A_{11} = -0.00288$;
$A_{12} = 0.000144$;
$A_{13} = -0.0014$;
$A_{14} = 0.0000907$; and
$A_{15} = -0.0000016$ $$\Gamma a_{max} = B_0 + B_1\theta + B_2\beta + B_3\theta\beta + B_4\theta^2 + B_5\beta^2 + B_6\theta^2\beta + B_7\theta\beta^2 + B_8\theta^2\beta^2 + B_9\theta^3 + B_{10}\beta^3 + B_{11}\theta\beta^3 + B_{12}\theta^2\beta^3 + B_{13}\theta^3\beta + B_{14}\theta^3\beta^2 + B_{15}\theta^3\beta^3$$

where:
$B_0 = 128.7937$;
$B_1 = -20.7435$;
$B_2 = 15.2463$;
$B_3 = 3.134559$;
$B_4 = 0.679509$;
$B_5 = -0.90929$;
$B_6 = -0.16465$;
$B_7 = -0.24201$;
$B_8 = 0.012904$;
$B_9 = -0.00617$;
$B_{10} = 0.011497$;
$B_{11} = 0.005092$;
$B_{12} = -0.00026$;
$B_{13} = 0.001931$;
$B_{14} = -0.00016$; and
$B_{15} = 0.00000323$ By determining the maximum value and the minimum value of the phase difference correction amount, and determining the phase difference correction amount within the range as described above, it is possible to improve the conversion efficiency at the cutting angle β and the optical axis azimuth angle θ to 1 or a value approximating 1 using the crystal plate with a thickness with which the crystal plate can be processed in the manufacturing processes and is relatively easy to handle. Therefore, the half-wave plate stably having the extremely high light efficiency with respect to a certain level of the wavelength fluctuation of the incident light can easily be designed.

According to another aspect of the invention, there is provided a half-wave plate including a single crystal plate made of an inorganic material having a birefringent property and rotatory power, wherein a polarization plane of linearly polarized light entering from an entrance surface of the crystal plate is rotated and then output from an exit surface of the crystal plate, and assuming that a phase difference of the half-wave plate is Γ, a correction amount of the phase difference is Γa, an optical axis azimuth angle formed between an optical axis projection line obtained by projecting the optical axis of the crystal plate on the entrance surface and a polarization plane of the linearly polarized light entering the entrance surface is θ, and an angle β formed between a normal line with respect to the entrance surface of the crystal plate and an optical axis of the crystal plate is set in a range of $5°≦β≦30°$, the following expressions are satisfied.

$$\Gamma = 180° + \Gamma a$$

$$\Gamma a = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^2$$

where:
$A_0 = -63.635$;
$A_1 = 6.966$;
$A_2 = 47.038$;
$A_3 = -0.325$;
$A_4 = -3.038$;
$A_5 = -3.559$;
$A_6 = 0.113$;
$A_7 = 0.213$;
$A_8 = -0.006$;
$A_9 = -0.004$;
$A_{10} = 0.000$;
$A_{11} = -0.001$;
$A_{12} = 0.000$;
$A_{13} = 0.000$;
$A_{14} = 0.003$; and
$A_{15} = 0.053$ By determining the optimum value of the phase difference correction amount as described above, the highest conversion efficiency at the cutting angle β and the optical axis azimuth angle θ can be realized using the crystal plate having the thickness with which the crystal plate can be processed in the manufacturing process and relatively easy to handle. Therefore, the half-wave plate with the highest light efficiency can easily be designed.

In another aspect of the invention, a diffraction grating pattern formed on at least either one of the entrance surface and the exit surface of the half-wave plate is provided, and therefore, it is possible for a single optical device to exert two functions of the half-wave plate and the diffraction grating, and therefore, reduction of the number of components, downsizing, and cost reduction can be achieved.

Further, according to another aspect of the invention, there is provided an optical pickup device including a light source, an objective lens adapted to focus light emitted from the light source on a recording medium, a light detector adapted to detect the light reflected by the recording medium, and the half-wave plate according to the above aspect of the invention disposed on a light path between the light source and the objective lens. By using the half-wave plate with improved conversion efficiency as described above, it is possible to realize the optical pickup device hardly affected by the wavelength fluctuation due to the temperature drift of the oscillating laser in use and capable of stably exerting preferable performance in a wavelength band broader than in the related art.

According to still another aspect of the invention, there is provided a polarization conversion element including a plate-lake translucent substrate having a first principal surface as a light entrance surface and a second principal surface as a light exit surface, first and second optical thin films disposed in the substrate, and a wave plate, wherein the first and second optical thin films are arranged alternately, in parallel to each other, with intervals so as to be tilted with respect to the first and second principal surfaces, the first optical thin film splits light entering from the first principal surface into first linearly polarized light and a second linearly polarized light perpendicular to each other, transmits the first linearly polarized light, and reflects the second linearly polarized light, the second optical thin film reflects the second linearly polarized light reflected by the first optical thin film to thereby emit the second linearly polarized light from the second principal surface, and the wave plate is the half-wave plate according to the invention described above disposed at a position where either one of the first linearly polarized light and the second linearly polarized light split by the first optical thin film is transmitted.

In the polarization conversion element, in another aspect of the invention, the half-wave plate is disposed at a portion of the second principal surface where the first linearly polarized light transmitted through the first optical thin film is emitted or at a portion of the second principal surface where the second linearly polarized light reflected by the second optical thin film is emitted. In another aspect of the invention, the half-wave plate is disposed in the translucent substrate, and arranged so as to be stacked on the exit surface of the first optical thin film where the first linearly polarized light is emitted. In either case, by using the half-wave plate with the conversion efficiency improved as described above, it becomes possible to realize the polarization conversion element having extremely high light efficiency in the band broader than in the related art.

Further, according to still another aspect of the invention, there is provided a projection display device including a light source, the polarization conversion element according to the above aspect of the invention adapted to convert the light from the light source into the second linearly polarized light and emit the second linearly polarized light, a modulation section adapted to modulate the second linearly polarized light emitted from the polarization conversion element in accordance with image information to be projected, and a projection optical system adapted to project the light modulated by the modulation section. Similarly, by using the half-wave plate with the conversion efficiency improved compared to the related art as described above, a brighter image can be obtained with the light source of the same output, or an image with a comparable brightness can be obtained when reducing the output of the light source, therefore, the power consumption can be reduced.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, some preferred embodiments of the invention will be described in detail with reference to the accompanying drawings.

Figure 6A:
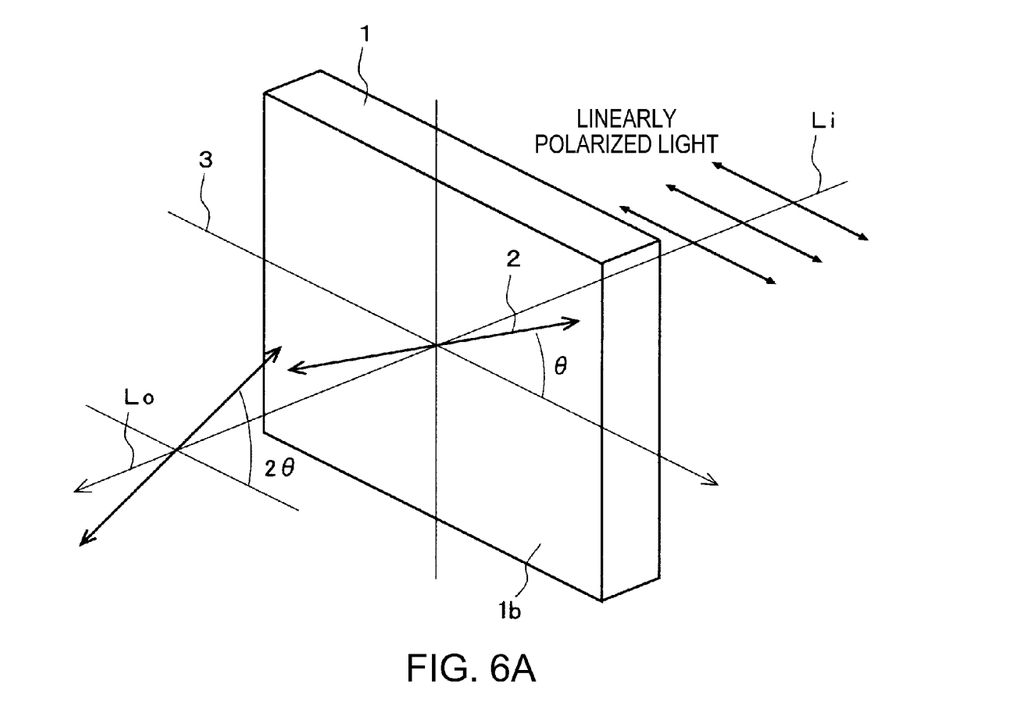
FIG. 6A is a perspective view of the half-wave plate according to the embodiment of the invention viewed from the light emission direction.
Figure 6B:
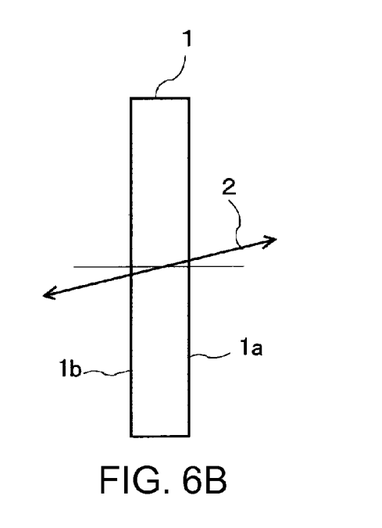
FIG. 6B is a side view of the half-wave plate shown in FIG. 6A.
Figure 6C:
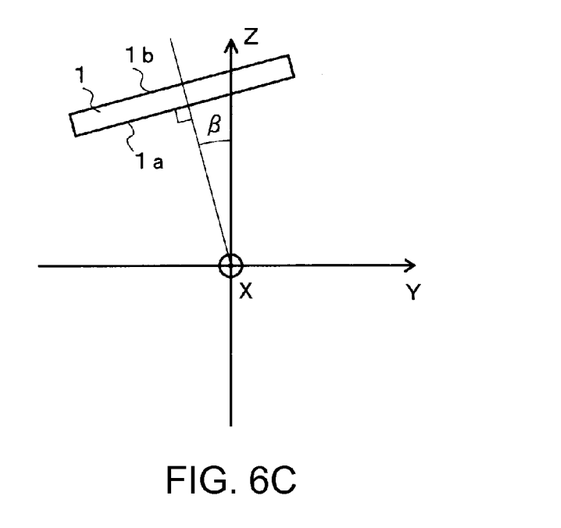
FIG. 6C is an explanatory diagram of the cutting angle of the quartz crystal plate.

FIGS. 6A and 6B schematically show a half-wave plate according to the embodiment of the invention. The half-wave plate 1 of the present embodiment is formed of a single quartz crystal wave plate with a constant thickness. As shown in FIG. 6C, the quartz crystal wave plate is carved out to be a quartz crystal plate having a cutting angle β defined by the normal line provided to the entrance surface 1a (or the exit surface 1b) and the crystal optical axis (the Z-axis) in a range of $5° \leq \beta \leq 30°$. In particular, by setting the cutting angle within this range, the quartz crystal wave plate having the thickness with which the plate has sufficient strength for preventing working and handling in manufacturing from becoming difficult as the single-plate half-wave plate can be processed.

The phase difference Γ of the half-wave plate 1 can be expressed as $\Gamma = 180° + \Gamma a$ assuming that the standard phase difference is 180°, and the phase difference correction amount corresponding thereto is Γa. The phase difference correction amount Γa is determined using the following relational expressions having the cutting angle β and optical axis azimuth angle $\theta$ of the half-wave plate 1 as parameters assuming the correction amount minimum value as $\Gamma a_{min}$, and the correction amount maximum value as $\Gamma a_{max}$.

$$\Gamma a_{min} < \Gamma a < \Gamma a_{max}$$

$$\Gamma a_{min} = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

where:
$A_0 = -58.9286$;
$A_1 = 12.35938$;
$A_2 = 12.8869$;
$A_3 = -2.75654$;
$A_4 = -0.571$;
$A_5 = -0.7629$;
$A_6 = 0.134076$;
$A_7 = 0.164482$;
$A_8 = -0.00816$;
$A_9 = 0.004949$;
$A_{10} = 0.013294$;
$A_{11} = -0.00288$;
$A_{12} = 0.000144$;
$A_{13} = -0.0014$;
$A_{14} = 0.0000907$; and
$A_{15} = -0.0000016$ $$\Gamma a_{max} = B_0 + B_1\theta + B_2\beta + B_3\theta\beta + B_4\theta^2 + B_5\beta^2 + B_6\theta^2\beta + B_7\theta\beta^2 + B_8\theta^2\beta^2 + B_9\theta^3 + B_{10}\beta^3 + B_{11}\theta\beta^3 + B_{12}\theta^2\beta^3 + B_{13}\theta^3\beta + B_{14}\theta^3\beta^2 + B_{15}\theta^3\beta^3$$

where:
$B_0 = 128.7937$;
$B_1 = -20.7435$;
$B_2 = 15.2463$;
$B_3 = 3.134559$;
$B_4 = 0.679509$;
$B_5 = -0.90929$;
$B_6 = -0.16465$;
$B_7 = -0.24201$;
$B_8 = 0.012904$;
$B_9 = -0.00617$;
$B_{10} = 0.011497$;
$B_{11} = 0.005092$;
$B_{12} = -0.00026$;
$B_{13} = 0.001931$;
$B_{14} = -0.00016$; and
$B_{15} = 0.00000323$ As shown in FIG. 6A, the phase difference due to the birefringent property of the quartz crystal and rotation of the polarization plane due to the rotatory power thereof act on the linearly polarized light entering from the entrance surface 1a of the half-wave plate 1. However, in the design phase difference $\Gamma$ of the half-wave plate 1, since the phase difference correction amount $\Gamma a$ is appropriately selected between the maximum value and the minimum value of the phase difference correction amount determined by the two parameters, namely the cutting angle $\beta$ and the optical axis azimuth angle $\theta$, the variation in the polarization state due to the rotatory power is corrected. As a result, the conversion efficiency is improved to be a value equal to or approximating 1, and the linearly polarized light of the incident light is emitted from the exit surface 1b as substantive linearly polarized light even if the wavelength is fluctuated to some extent.

Therefore, if the half-wave plate according to the present embodiment is used in the optical pickup device for recording/reproduction optical discs compliant with the Blu-ray standard or projection display devices, it becomes possible not only to obtain superior light resistance and long-term reliability, but also to realize high-efficiency optical pickup devices or optical engines since extremely high light efficiency can stably be obtained. Further, it is very advantageous since reduction of the power consumption can thus be achieved.

Further, in the present embodiment, if the phase difference $\Gamma$ of the half-wave plate 1 is expressed as $\Gamma = 180° + \Gamma a$ assuming the standard phase difference as 180°, and the phase difference correction amount corresponding thereto as $\Gamma a$, the optimum value of the phase correction amount can be determined using the following relational expression having the cutting angle $\beta$ thereof and the optical axis azimuth angle $\theta$ as parameters.

$$\Gamma a = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

where:
$A_0 = -63.635$;
$A_1 = 6.966$;
$A_2 = 47.038$;
$A_3 = -0.325$;
$A_4 = -3.038$;
$A_5 = -3.559$;
$A_6 = 0.113$;
$A_7 = 0.213$;
$A_8 = -0.006$;
$A_9 = -0.004$;
$A_{10} = 0.000$;
$A_{11} = -0.001$;
$A_{12} = 0.000$;
$A_{13} = 0.000$;
$A_{14} = 0.003$; and
$A_{15} = 0.053$ By thus determining the optimum value of the phase difference correction amount, it is possible to realize the highest conversion efficiency in the cutting angle $\beta$ and the optical axis azimuth angle $\theta$ of the quartz crystal plate to be used. Therefore, the linearly polarized light of the incident light is emitted from the exit surface 1b as substantially linearly polarized light. As a result, since it is possible to obtain the half-wave plate with the highest light efficiency, the optical pickup device and the optical engine with extremely high efficiency can be realized.

Figure 7A:
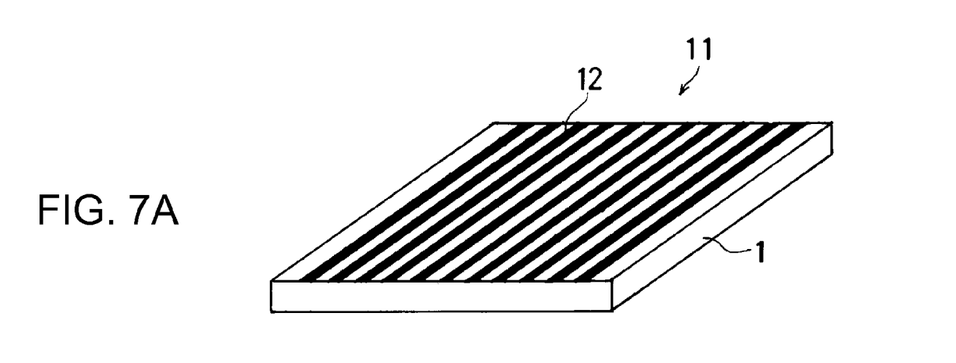
FIG. 7A is a perspective view showing a half-wave plate according to another embodiment of the invention.
Figure 7B:
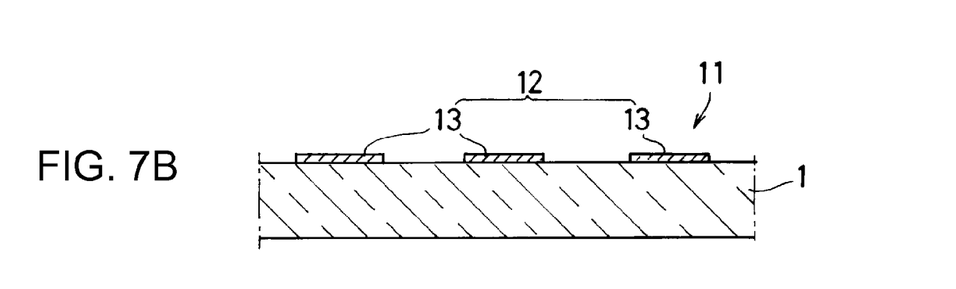
FIG. 7B is a partial enlarged cross-sectional view of the half-wave plate shown in FIG. 7A.

FIGS. 7A and 7B show a half-wave plate according to another embodiment of the invention. The half-wave plate 11 according to the present embodiment is obtained by providing a diffraction grating pattern 12 to the exit surface of the half-wave plate 1 shown in FIGS. 6A through 6C. The diffraction grating pattern 12 is formed on the surface of the quartz crystal plate by, for example, patterning an evaporated film made of $SiO_2$ or the like to form a grating. In still another embodiment, it is also possible to form the diffraction grating pattern 12 by processing the surface of the quartz crystal plate by, for example, an etching process to form grooves shaped like a grating.

When transmitting a laser beam upward from the lower side of the drawing therethrough, for example, the half-wave plate 11 splits the laser beam into three laser beams, namely a main beam L0 and two side beams L+1, L−1 with the diffraction grating pattern 12 when rotating the polarization plane of the incident linearly polarized light by a predetermined angle and then emitting it as linearly polarized light. As described above, in the present embodiment, a single optical device exerts the two functions of the half-wave plate and the diffraction grating. Therefore, in the case of using the optical device in optical equipment such as an optical head, it is possible to achieve reduction of the number of components, downsizing, and cost reduction.

Figure 8:
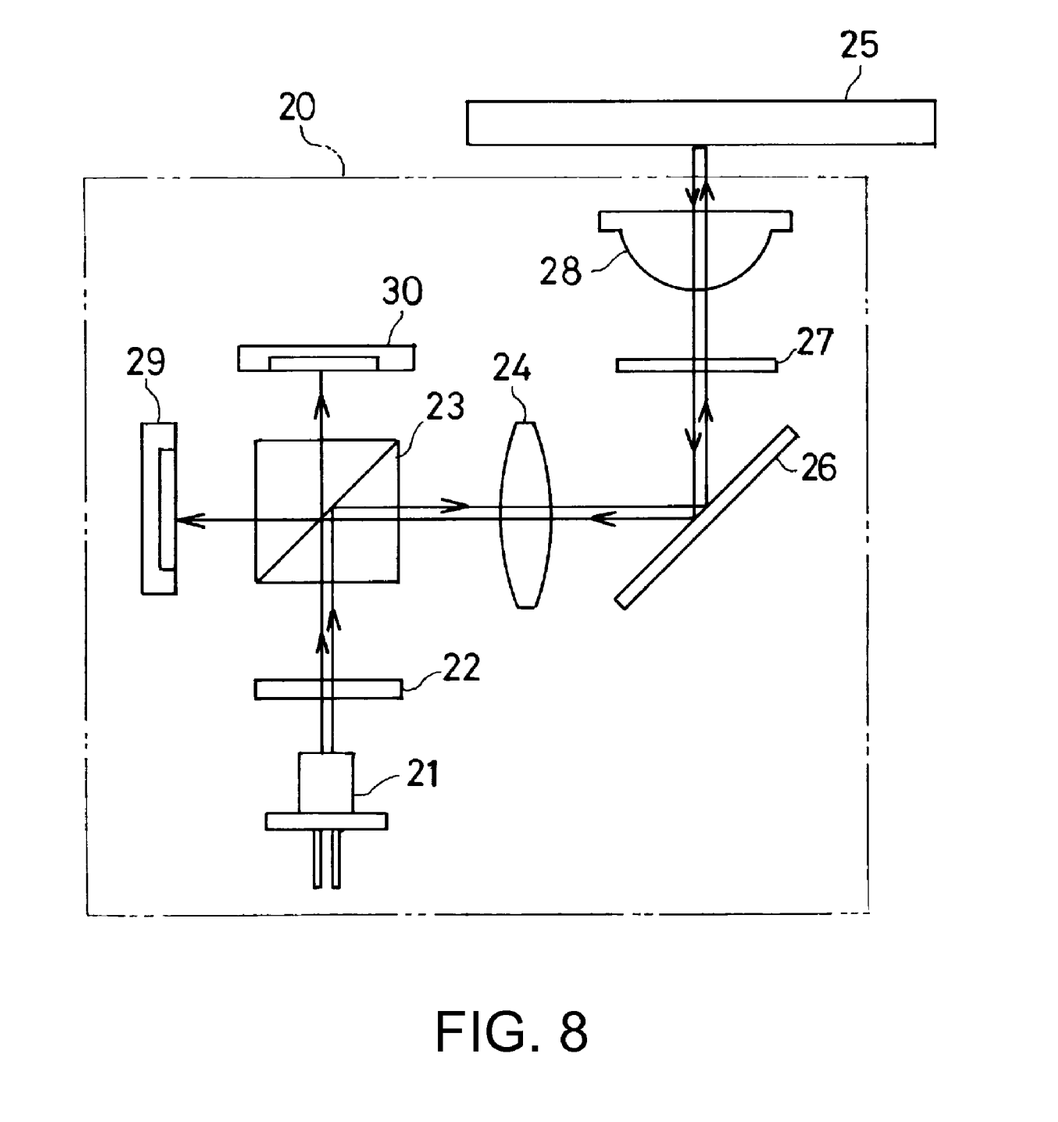
FIG. 8 is a schematic diagram showing a configuration of an optical pickup device according to an embodiment of the invention using the half-wave plate.

FIG. 8 shows an optical pickup device as an embodiment of the invention using the half-wave plate of the above embodiments of the invention. The optical pickup device 20 is for use in recording/reproduction of an optical disk drive such as Blu-ray Disc (trademark), and has a light source 21 formed of a laser diode for emitting a laser beam as blue-violet light with a wavelength of 405 nm, for example. The optical pickup device 20 is provided with a diffraction grating 22 for diffracting the laser beam from the light source 21, a polarizing beam splitter 23 for splitting the laser beams transmitted through the diffraction grating into a P-polarized component and an S-polarized component and transmitting or reflecting them, a collimating lens 24 for collimating the laser beam reflected by the polarizing beam splitter into a parallel light beam, a mirror 26 for reflecting the laser beam, which is transmitted through the collimating lens, toward an optical disc 25, a quarter wave plate 27 for converting the laser beam as linearly polarized light reflected by the mirror into circularly polarized light, an objective lens 28 for condensing the laser beam transmitted through the quarter wave plate, and a light detector 29 for detecting the laser beam reflected by the optical disc 25. Further, the optical pickup device 20 has a monitoring light detector 30 for detecting the laser beam emitted from the light source 21 and transmitted through the polarizing beam splitter 23.

The diffraction grating 22 is formed of the half-wave plate 11 according to the embodiment of the invention described above in conjunction with FIGS. 7A and 7B. Thus, even if the wavelength of the laser beam is fluctuated due to the temperature drift of the oscillating laser when using the optical pickup device 20, the conversion efficiency of the half-wave plate can be prevented from being deteriorated or the deterioration can be suppressed to the minimum, and it becomes possible to constantly assure sufficient light intensity. As a result, it becomes possible to realize the optical pickup device capable of stably exerting preferable performance in a wavelength range broader than in the related art in accordance with wavelength reduction and increase in power of the laser beam used.

The optical pickup device 20 operates as follows. The laser beam as the linearly polarized light emitted from the light source 21 is split by the diffraction grating 22 into three beams for tracking control by the three-beam method, and then the S-polarized component thereof is reflected by the polarizing beam splitter 23, and formed as the parallel light by the collimating lens 24. The laser beam as the parallel light is totally reflected by the mirror 26, converted by the quarter wave plate 27 from the linearly polarized light to the circularly polarized light, condensed by the objective lens 28, and then applied to a pit of a signal recording layer provided to the optical disc 25. The laser beam reflected by the pit is transmitted through the objective lens, converted by the quarter wave plate 27 from the circularly polarized light to the linearly polarized light, totally reflected by the mirror 26, transmitted through the collimating lens 24 and the polarizing beam splitter 23, and input to and then detected by the light detector 29. Thus, the operation of reading the signal recorded on the optical disc is performed. Further, the P-polarized component of the laser beam thus emitted from the light source 21 is transmitted through the polarizing beam splitter 23, and input to and then detected by the monitoring light detector 30. Based on the detection output, the output of the laser beam emitted from the laser diode is controlled.

Since the half-wave plate according to the embodiment of the invention has extremely high light efficiency, it is preferably used in, for example, a projection display device provided with a liquid crystal panel such as a liquid crystal projector. In particular, in the projection display device using the liquid crystal panel of a type of modulating a light beam (an S-polarized light beam or a P-polarized light beam) of a specific polarization direction, the optical system is generally set so that the linearly polarized light is converted into either one of the P-polarized light and the S-polarized light and then input to the liquid crystal panel. In this respect, the projection display device is provided with the polarization conversion element (a PS conversion element) having a function of conversing the random polarized light from the light source into either one of the P-polarized light and the S-polarized light to thereby improve the light efficiency.

Figure 9A:
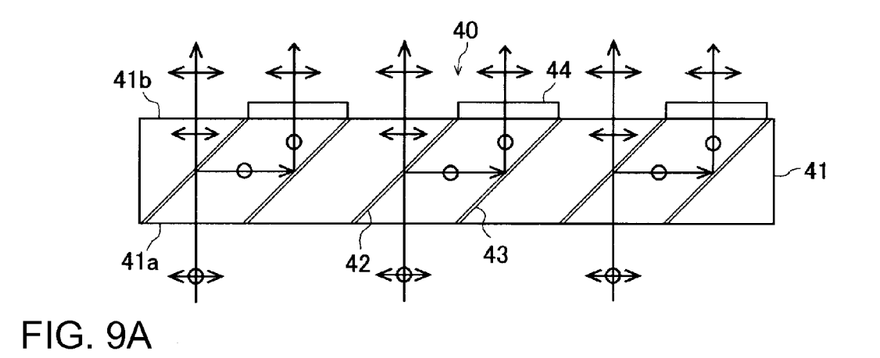
FIGS. 9A through 9C are schematic diagrams showing configurations of a polarization conversion element according to an embodiment of the invention using the half-wave plate.
Figure 9B:
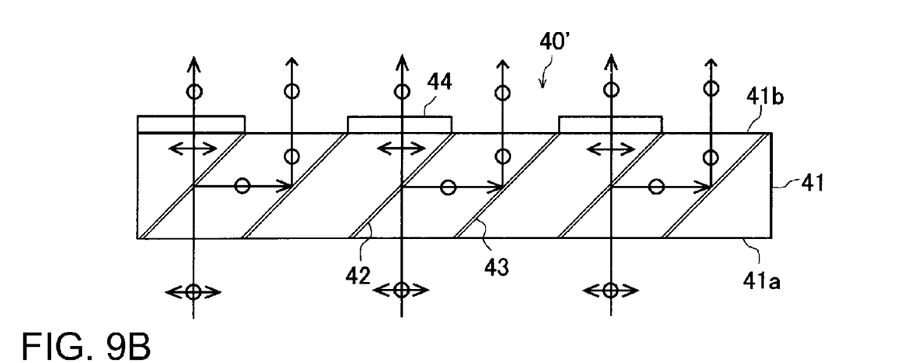
Figure 9C:
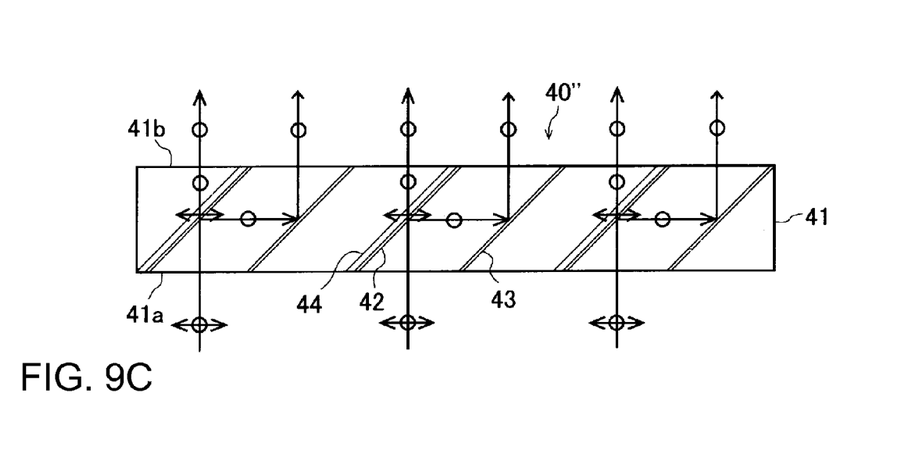

FIGS. 9A through 9C respectively show three polarization conversion elements 40, 40', 40" having configurations different from each other which are suitable to be used in a projection display device such as a liquid crystal projector, and the half-wave plate according to the embodiment of the invention can be used in either one of the polarization conversion elements. Thus, since each of the polarization conversion elements 40, 40', 40" can suppress the deterioration of the conversion efficiency in a band broader than in the related art to a minimum, it is possible to more efficiently use the light energy.

The polarization conversion element 40 shown in FIG. 9A is provided with a prism array 41 formed of a plate-like translucent substrate having a first principal surface 41a as a light entrance surface and a second principal surface 41b as a light exit surface. In the translucent substrate, there are arranged polarization split films 42 and reflecting films 43, which are tilted with respect to the first and second principal surfaces, alternately in parallel to each other with predetermined intervals.

The polarization split film 42 splits the random light entering the prism array 41 from the first principal surface 41a into the S-polarized component and the P-polarized component, transmits the P-polarized component, and reflects the S-polarized component. The P-polarized component transmitted through the polarization split film 42 is directly output from the prism array 41 via the second principal surface 41b. The S-polarized component reflected by the polarization split film 42 is further reflected by the reflecting film 43, and is output from the prism array 41 via the second principal surface 41b. The second principal surface 41b is provided with half-wave plates 44 at the portions from which the S-polarized component reflected by the reflecting films is emitted. The half-wave plate 44 converts the linearly polarized light as the S-polarized light input thereto into the P-polarized light and then emits the P-polarized light. As described above, the polarization conversion element 40 aligns the incident light into the P-polarized light and then emits the P-polarized light, and is therefore suitable to be provided to the projection display device with a P-polarization optical system.

FIG. 9B shows a configuration of the polarization conversion element 40' suitable to be provided to a projection display device with an S-polarization optical system. The polarization conversion element 40' has the half-wave plates 44 disposed on the portions of the second principal surface 41b from which the P-polarized component transmitted through the polarization split film 42 is emitted. Thus, the linearly polarized light as the P-polarized light transmitted through the polarization split film 42 is converted into the S-polarized light and is then emitted. On the other hand, the S-polarized component reflected by the polarization split film is reflected by the reflecting film 43, and is then emitted from the prism array 41 as the S-polarized light without modification. Therefore, the light entering the polarization conversion element 40' is aligned to the S-polarized light, and is then emitted.

FIG. 9C shows a polarization conversion element 40" having a structure of disposing the half-wave plates 44 in the translucent substrate of the prism array 41. The half-wave plates 44 are stacked on the exit surfaces of the respective polarization split films 42, and are arranged alternately in parallel to each other with predetermined intervals with the corresponding reflecting films 43.

The polarization split film 42 splits the random light entering from the first principal surface 41a into the S-polarized component and the P-polarized component, transmits the P-polarized component, and reflects the S-polarized component. The S-polarized component reflected by the polarization split film 42 is further reflected by the reflecting film 43, and is output from the prism array 41 via the second principal surface 41b. The P-polarized component transmitted through the polarization split film directly enters the half-wave plate 44 to be converted into the S-polarized light, and is emitted from the prism array 41 via the second principal surface. As described above, the light entering the polarization conversion element 40" is aligned to the S-polarized light, and is then emitted.

Figure 10:
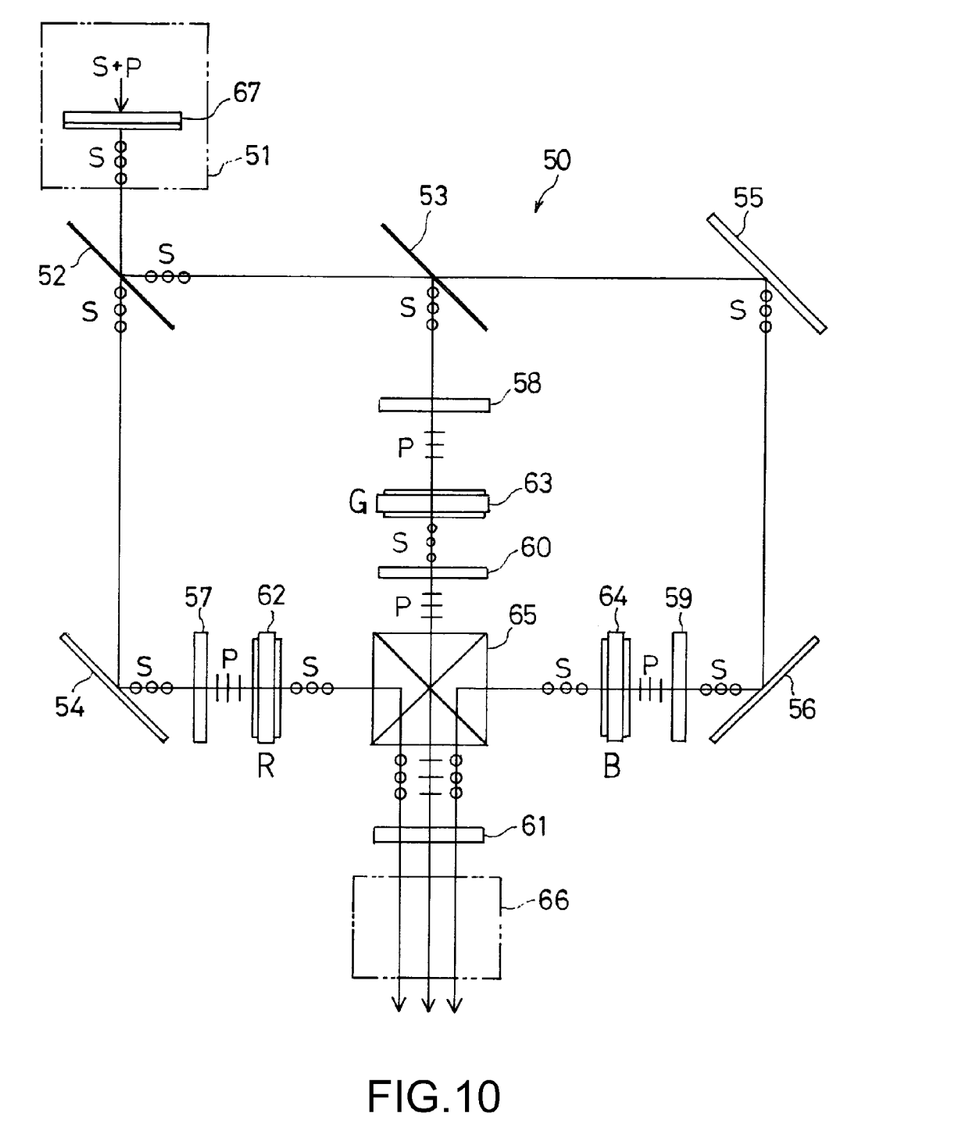
FIG. 10 is a schematic diagram showing a configuration of a projection display device according to an embodiment of the invention using the half-wave plate.

FIG. 10 schematically shows a projection display device according to an embodiment of the invention using the half-wave plate of the above embodiments of the invention. The projection display device 50 is provided with an illumination optical system 51, dichroic mirrors 52, 53, reflecting mirrors 54 through 56, λ/2 retardation plates 57 through 61, liquid crystal light valves 62 through 64, a cross dichroic prism 65, and a projection lens system 66. The illumination optical system 50 is provided with a light source, a polarization conversion element 67, a condenser lens, and so on in order for illuminating the liquid crystal light valves 62 through 64. The polarization conversion element shown in FIGS. 9A through 9C can be used as the polarization conversion element 67, and converts the random light from the light source into the S-polarized light, and then outputs the S-polarized light.

The red light component of the white light as the S-polarized light emitted from the illumination optical system 51 is transmitted through the dichroic mirror 52, and the blue light component and the green light component thereof are reflected there. The red light transmitted through the dichroic mirror 52 is reflected by the reflecting mirror 54, transmitted through the λ/2 retardation plate 57 to be converted into the P-polarized light, and then enters the liquid crystal light valve 62 for the red light. The green light reflected by the dichroic mirror 52 is further reflected by the dichroic mirror 53, transmitted through the λ/2 retardation plate 58 to be converted into the P-polarized light, and then enters the liquid crystal light valve 63 for the green light. The blue light reflected by the dichroic mirror 52 is transmitted through the dichroic mirror 53, reflected by the reflecting mirrors 55, 56, transmitted through the λ/2 retardation plate 59 to be converted into the P-polarized light, and then enters the liquid crystal light valve 64 for the blue light.

The liquid crystal light valves 62 through 64 are light modulation sections for forming an image by modulating the colored light beams of the respective colors based on the image information (image signals) provided thereto, respectively. The cross dichroic prism 65 is a color combining section for forming a color image by combining the red light and the blue light as the S-polarized light beams emitted from the liquid crystal light valves 62, 64, respectively, and the green light beam converted into the P-polarized light after being output from the liquid crystal light valve 63. The combined light beam is output to the projection lens system 66 via the λ/2 retardation plate 61. The projection lens system 66 is a projection optical system for projecting the combined light beam on the projection screen to thereby display a color image.

If the direction of the optical axis of the λ/2 retardation plate 61 is determined so as to change the polarization directions of the S-polarized light beams (the red light beam and the blue light beam) and the P-polarized light beam (the green light beam) by approximately 45°, respectively, the S-polarized light component and the P-polarized light component of the three colored light beams become roughly fifty-fifty, and therefore, the color image can finely be projected on the polarizing screen. Further, a λ/4 retardation plate can be used instead of the λ/2 retardation plate 61. In this case, by converting the three light beams of the respective colors of red, green, and blue into elliptically polarized light beams, preferably circularly polarized light beams, the color image can finely be projected in the case of using the polarizing screen as the projection screen.

The half-wave plate according to the embodiment of the invention can be used as the λ/2 retardation plates 57 through 61. Thus, it becomes possible for the projection display device 50 to improve the conversion efficiency in each of the λ/2 retardation plates to thereby improve the light efficiency compared to the related art. As a result, since a brighter color image can be obtained with a light source of the same output, or a color image with a comparable brightness can be obtained when replacing the light source with one having a lower output, the power consumption can be reduced.

The invention is not limited to the embodiments described above, but can be put into practice with modifications or changes applied thereto within the scope and the spirits of the invention. For example, the wave plate of the invention can be formed of an optically uniaxial crystal material other than the quartz crystal plate. Further, the invention can also be applied to the optical pickup devices, the polarization conversion elements, and the projection display devices having configurations different from those of the embodiments described above, or to other optical devices in substantially the same manner.

The entire disclosure of Japanese Patent Application No. 2009-252228, filed Nov. 2, 2009 is expressly incorporated by reference herein.

What is claimed is:
1. A half-wave plate comprising:
a single crystal plate made of an inorganic material having a birefringent property and rotatory power, wherein a polarization plane of linearly polarized light entering from an entrance surface of the crystal plate is rotated and then output from an exit surface of the crystal plate, and
assuming that a phase difference of the half-wave plate is $\Gamma$, a correction amount of the phase difference is $\Gamma a$, an optical axis azimuth angle formed between an optical axis projection line obtained by projecting the optical axis of the crystal plate on the entrance surface and a polarization plane of the linearly polarized light entering the entrance surface is $\theta$, and an angle $\beta$ formed between a normal line with respect to the entrance surface of the crystal plate and an optical axis of the crystal plate is set in a range of $5° \leq \beta \leq 30°$, the following expressions are satisfied $$\Gamma = 180° + \Gamma a$$

$$\Gamma a_{min} < \Gamma a < \Gamma a_{max}$$

$$\Gamma a_{min} = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

where:
$A_0 = -58.9286$;
$A_1 = 12.35938$;
$A_2 = 12.8869$;
$A_3 = -2.75654$;
$A_4 = -0.571$;
$A_5 = -0.7629$;
$A_6 = 0.134076$;
$A_7 = 0.164482$;
$A_8 = -0.00816$;
$A_9 = 0.004949$;
$A_{10} = 0.013294$;
$A_{11} = -0.00288$;
$A_{12} = 0.000144$;
$A_{13} = -0.0014$;
$A_{14} = 0.0000907$; and
$A_{15} = -0.0000016$ $$\Gamma a_{max} = B_0 + B_1\theta + B_2\beta + B_3\theta\beta + B_4\theta^2 + B_5\beta^2 + B_6\theta^2\beta + B_7\theta\beta^2 + B_8\theta^2\beta^2 + B_9\theta^3 + B_{10}\beta^3 + B_{11}\theta\beta^3 + B_{12}\theta^2\beta^3 + B_{13}\theta^3\beta + B_{14}\theta^3\beta^2 + B_{15}\theta^3\beta^3$$

where:
$B_0 = 128.7937$;
$B_1 = -20.7435$;
$B_2 = 15.2463$;
$B_3 = 3.134559$;
$B_4 = 0.679509$;
$B_5 = -0.90929$;
$B_6 = -0.16465$;
$B_7 = -0.24201$;
$B_8 = 0.012904$;
$B_9 = -0.00617$;
$B_{10} = 0.011497$;
$B_{11} = 0.005092$;
$B_{12} = -0.00026$;
$B_{13} = 0.001931$;
$B_{14} = -0.00016$; and
$B_{15} = 0.00000323$.

2. A half-wave plate comprising:
a single crystal plate made of an inorganic material having a birefringent property and rotatory power, wherein a polarization plane of linearly polarized light entering from an entrance surface of the crystal plate is rotated and then output from an exit surface of the crystal plate, and
assuming that a phase difference of the half-wave plate is $\Gamma$, a correction amount of the phase difference is $\Gamma a$, an optical axis azimuth angle formed between an optical axis projection line obtained by projecting the optical axis of the crystal plate on the entrance surface and a polarization plane of the linearly polarized light entering the entrance surface is $\theta$, and an angle $\beta$ formed between a normal line with respect to the entrance surface of the crystal plate and an optical axis of the crystal plate is set in a range of $5° \leq \beta \leq 30°$, the following expressions are satisfied $$\Gamma = 180° + \Gamma a$$

$$\Gamma a = A_0 + A_1\theta + A_2\beta + A_3\theta\beta + A_4\theta^2 + A_5\beta^2 + A_6\theta^2\beta + A_7\theta\beta^2 + A_8\theta^2\beta^2 + A_9\theta^3 + A_{10}\beta^3 + A_{11}\theta\beta^3 + A_{12}\theta^2\beta^3 + A_{13}\theta^3\beta + A_{14}\theta^3\beta^2 + A_{15}\theta^3\beta^3$$

where:
$A_0 = -63.635$;
$A_1 = 6.966$;
$A_2 = 47.038$;
$A_3 = -0.325$;
$A_4 = -3.038$;
$A_5 = -3.559$;
$A_6 = 0.113$;
$A_7 = 0.213$;
$A_8 = -0.006$;
$A_9 = -0.004$;
$A_{10} = 0.000$;
$A_{11} = -0.001$;
$A_{12} = 0.000$;
$A_{13} = 0.000$;
$A_{14} = 0.003$; and
$A_{15} = 0.053$.

3. The half-wave plate according to claim 1, further comprising:
a diffraction grating pattern provided to at least either one of the entrance surface and the exit surface.

4. The half-wave plate according to claim 1, wherein the crystal plate is formed of a quartz crystal.

5. An optical pickup device comprising:
a light source;
an objective lens adapted to focus light emitted from the light source on a recording medium;
a light detector adapted to detect the light reflected by the recording medium; and
the half-wave plate according to claim 1 disposed on a light path between the light source and the objective lens.

6. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and
the wave plate is the half-wave plate according to claim 1 disposed at a position where either one of the first linearly polarized light and the second linearly polarized light split by the first optical thin film is transmitted.

7. A projection display device comprising:
a light source;
the polarization conversion element according to claim 6 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

8. The projection display device according to claim 7 wherein
the modulation section is a liquid crystal panel.

9. The half-wave plate according to claim 3, wherein the crystal plate is formed of a quartz crystal.

10. An optical pickup device comprising:
a light source;
an objective lens adapted to focus light emitted from the light source on a recording medium;
a light detector adapted to detect the light reflected by the recording medium; and
the half-wave plate according to claim 3 disposed on a light path between the light source and the objective lens.

11. An optical pickup device comprising:
a light source;
an objective lens adapted to focus light emitted from the light source on a recording medium;
a light detector adapted to detect the light reflected by the recording medium; and
the half-wave plate according to claim 4 disposed on a light path between the light source and the objective lens.

12. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and
the wave plate is the half-wave plate according to claim 3 disposed at a position where either one of the first linearly polarized light and the second linearly polarized light split by the first optical thin film is transmitted.

13. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and
the wave plate is the half-wave plate according to claim 4 disposed at a position where either one of the first linearly polarized light and the second linearly polarized light split by the first optical thin film is transmitted.

14. A projection display device comprising:
a light source;
the polarization conversion element according to claim 12 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

15. A projection display device comprising:
a light source;
the polarization conversion element according to claim 13 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

16. The projection display device according to claim 14 wherein
the modulation section is a liquid crystal panel.

17. The projection display device according to claim 15 wherein
the modulation section is a liquid crystal panel.

18. The half-wave plate according to claim 2, further comprising:
a diffraction grating pattern provided to at least either one of the entrance surface and the exit surface.

19. The half-wave plate according to claim 2, wherein
the crystal plate is formed of a quartz crystal.

20. An optical pickup device comprising:
a light source;
an objective lens adapted to focus light emitted from the light source on a recording medium;
a light detector adapted to detect the light reflected by the recording medium; and
the half-wave plate according to claim 2 disposed on a light path between the light source and the objective lens.

21. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and the wave plate is the half-wave plate according to claim 2 disposed at a position where either one of the first linearly polarized light and the second linearly polarized light split by the first optical thin film is transmitted.

22. A projection display device comprising:
a light source;
the polarization conversion element according to claim 21 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

23. The projection display device according to claim 22 wherein
the modulation section is a liquid crystal panel.

24. The half-wave plate according to claim 18, wherein the crystal plate is formed of a quartz crystal.

25. An optical pickup device comprising:
a light source;
an objective lens adapted to focus light emitted from the light source on a recording medium;
a light detector adapted to detect the light reflected by the recording medium; and
the half-wave plate according to claim 18 disposed on a light path between the light source and the objective lens.

26. An optical pickup device comprising:
a light source;
an objective lens adapted to focus light emitted from the light source on a recording medium;
a light detector adapted to detect the light reflected by the recording medium; and
the half-wave plate according to claim 19 disposed on a light path between the light source and the objective lens.

27. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and
the wave plate is the half-wave plate according to claim 18 disposed at a position where either one of the first linearly polarized light and the second linearly polarized light split by the first optical thin film is transmitted.

28. A polarization conversion element comprising:
a plate-lake translucent substrate having a first principal surface as a light entrance surface and a second principal surface as a light exit surface;
first and second optical thin films disposed in the substrate; and
a wave plate,
wherein the first and second optical thin films are arranged alternately, in parallel to each other, with intervals so as to be tilted with respect to the first and second principal surfaces,
the first optical thin film splits light entering from the first principal surface into first linearly polarized light and a second linearly polarized light perpendicular to each other, transmits the first linearly polarized light, and reflects the second polarized light,
the second optical thin film reflects the second linearly polarized light reflected by the first optical thin film to thereby emit the second linearly polarized light from the second principal surface, and
the wave plate is the half-wave plate according to claim 19 disposed at a position where either one of the first linearly polarized light and the second linearly polarized light split by the first optical thin film is transmitted.

29. A projection display device comprising:
a light source;
the polarization conversion element according to claim 27 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

30. A projection display device comprising:
a light source;
the polarization conversion element according to claim 28 adapted to convert the light from the light source into the second linearly polarized light and emit the second linearly polarized light;
a modulation section adapted to modulate the second linearly polarized light emitted from the polarization conversion element in accordance with image information to be projected; and
a projection optical system adapted to project the light modulated by the modulation section.

31. The projection display device according to claim 29 wherein
the modulation section is a liquid crystal panel.

32. The projection display device according to claim 30 wherein
the modulation section is a liquid crystal panel.

* * * * *